United States Patent
Chung et al.

(10) Patent No.: US 8,518,575 B2
(45) Date of Patent: *Aug. 27, 2013

(54) POUCH-TYPE LITHIUM SECONDARY BATTERY AND FABRICATION METHOD THEREOF

(75) Inventors: Hyun-Jei Chung, Cheonan-si (KR); Hyung-Bok Lee, Seoul (KR)

(73) Assignee: Samsung SDI Co., Ltd., Yongin, Gyeonggi-do (KR)

( * ) Notice: Subject to any disclaimer, the term of this patent is extended or adjusted under 35 U.S.C. 154(b) by 1103 days.

This patent is subject to a terminal disclaimer.

(21) Appl. No.: 10/791,269

(22) Filed: Mar. 3, 2004

(65) Prior Publication Data

US 2004/0234848 A1 Nov. 25, 2004

(30) Foreign Application Priority Data

May 22, 2003 (KR) .................. 10-2003-0032554

(51) Int. Cl.
*H01M 2/26* (2006.01)
*H01M 14/00* (2006.01)
*H01M 2/02* (2006.01)
*H01M 2/08* (2006.01)

(52) U.S. Cl.
USPC ............... 429/121; 429/7; 429/181; 429/185

(58) Field of Classification Search
USPC ........................................... 429/181
See application file for complete search history.

(56) References Cited

U.S. PATENT DOCUMENTS

| | | | |
|---|---|---|---|
| 6,387,567 B1 * | 5/2002 | Noh | 429/211 |
| 6,451,474 B1 * | 9/2002 | Kozu et al. | 429/100 |
| 6,822,420 B2 | 11/2004 | Kozu et al. | |
| 6,861,821 B2 * | 3/2005 | Masumoto et al. | 320/107 |
| 6,994,926 B2 * | 2/2006 | Ikeuchi et al. | 429/7 |
| 2002/0039283 A1 * | 4/2002 | Nakamura et al. | 361/736 |
| 2003/0099880 A1 | 5/2003 | Park et al. | |
| 2003/0165736 A1 * | 9/2003 | Hiratsuka | 429/153 |
| 2004/0234848 A1 | 11/2004 | Chung et al. | |

(Continued)

FOREIGN PATENT DOCUMENTS

| | | |
|---|---|---|
| CN | 2268313 | 11/1997 |
| CN | 1322026 | 11/2001 |

(Continued)

OTHER PUBLICATIONS

Definition of Substantially retrieved from Dictionary.com on Jan. 6, 2012.*

(Continued)

*Primary Examiner* — Ula C Ruddock
*Assistant Examiner* — Matthew Van Oudenaren
(74) *Attorney, Agent, or Firm* — Knobbe, Martens, Olson & Bear, LLP

(57) ABSTRACT

A pouch-type lithium secondary battery including a battery unit having a positive electrode plate, a negative electrode plate, and a separator between the positive and negative electrode plates; electrode tabs extending from each of the positive and negative electrode plates of the battery unit, respectively; a case having a space to accommodate the battery unit; a sealing surface along the periphery of the space; and a protection circuit board electrically connected to the electrode tabs, wherein portions of each of the electrode tabs extend outside the case, and are bent in an upright position with respect to a plane of the sealing surface.

3 Claims, 3 Drawing Sheets

(56) References Cited

U.S. PATENT DOCUMENTS

2005/0112456 A1 * 5/2005 Kozu et al. ............... 429/62
2006/0051668 A1    3/2006 Chung et al.
2006/0068275 A1    3/2006 Chung et al.

FOREIGN PATENT DOCUMENTS

| CN | 1323075 | 11/2001 |
|---|---|---|
| CN | 100517850 C | 7/2009 |
| JP | 2000-173576 | 6/2000 |
| JP | 2000-173580 | 6/2000 |
| JP | 2000-311713 | 11/2000 |
| JP | 2002-203534 | 7/2002 |
| JP | 2003-142054 | 5/2003 |
| KR | 2000-0038817 | 7/2000 |
| KR | 2002-0074550 * | 10/2002 |
| WO | WO 0169699 | 9/2001 |
| WO | WO 01/99211 A1 * | 12/2001 |
| WO | WO 03003485 A1 * | 1/2003 |

OTHER PUBLICATIONS

Definition of Perpendicular retrieved from Dictionary.com on Jan. 6, 2012.*
U.S. Appl. No. 11/265,131, filed Nov. 3, 2005, Hyun-Jei Chung, et al., Samsung SDI Co.
U.S. Appl. No. 11/280,463, filed Nov. 17, 2005, Hyun-Jei Chung, et al., Samsung SDI Co.
Certificate of Patent No. ZL200410033441 issued by the Chinese Intellectual Property Office on Jul. 22, 2009.

* cited by examiner

POUCH-TYPE LITHIUM SECONDARY BATTERY AND FABRICATION METHOD THEREOF

CROSS-REFERENCE TO RELATED APPLICATIONS

This application claims the benefit of Korean Patent Application No. 2003-32554, filed on May 22, 2003 in the Korean Intellectual Property Office, the disclosure of which is incorporated hereinto by reference.

BACKGROUND OF THE INVENTION

1. Field of the Invention

The present invention relates to a lithium secondary battery, and, more particularly, to an improved structure of connection between an electrode tab and a protection circuit board electrically connected thereto, and a pouch-type lithium secondary battery having the improved connection structure and a fabrication method thereof.

2. Description of the Related Art

With the development of portable electronic devices such as cellular phones, notebook-type computers, camcorders, and the like, increased research into secondary batteries generally capable of charging and discharging is being conducted. Lithium batteries are classified into nickel-cadmium (Ni—Cd) batteries, nickel-hydride (Ni-MH) batteries, and lithium secondary batteries. Specifically, the lithium secondary batteries are being rapidly developed in view of their high operating voltage of 3.6 V or higher, which is approximately 3 times that of the nickel-cadmium (Ni—Cd) batteries or nickel-hydride (Ni-MH) batteries, and due to their excellent energy density per unit weight.

The lithium secondary batteries may be classified into liquid electrolyte batteries and solid electrolyte batteries, according to the electrolyte used. In general, batteries using a liquid electrolyte are referred to as lithium-ion batteries, and batteries using a polymeric electrolyte are referred to as lithium polymer batteries.

The lithium secondary batteries may be manufactured in various shapes, and are typically formed in cylindrical and rectangular shapes. Lithium polymer batteries, which have attracted much attention recently, are manufactured in a flexible pouch shape so that they are relatively free in view of shape design. Also, lithium polymer secondary batteries, which have excellent safety characteristics and are light in weight, are advantageous in attaining miniaturized and lightweight portable electronic apparatuses.

FIG. 1 shows a conventional pouch-type lithium secondary battery 10, and FIG. 2 is a partially extracted cross-sectional view of the lithium secondary battery shown in FIG. 1. Referring to the drawings, the lithium secondary battery 10 includes a battery unit 11, a case 12, and a space 12a, provided in the case 12, in which the battery unit 11 is accommodated.

The battery unit 11 includes a positive electrode plate 13, a negative electrode plate 14, and a separator 15 interposed therebetween. The positive electrode plate 13, the separator 15, and the negative electrode plate 14 are stacked in sequence. In such a state, the stacked structure is laminated and wound in a jelly-roll type structure.

The positive electrode plate 13 and the negative electrode plate 14 are electrically connected to a positive electrode tab 16 and a negative electrode tab 17, respectively. The positive and negative electrode tabs 16 and 17 extend a predetermined length outward from a sealing surface 12b of the case 12. A portion where the positive electrode tab 16 and the negative electrode tab 17 are electrically connected to the sealing surface 12b is wrapped by an insulating tape 18, thereby increasing sealing efficiency.

Unlike the cylindrical or rectangular lithium secondary battery, which use a thick metal plate as a packaging material, the case 12 is preferably formed in a pouch type laminate constructed with a medium layer made of a thin metal foil, and inner and outer coatings fixed to both surfaces of the medium layer, respectively, thereby providing bending flexibility.

The positive and negative electrode tabs 16 and 17, extending outside the sealing surface 12b, are electrically connected to a protection circuit board 100. A safety element, such as a positive temperature coefficient (PTC) element, is provided in the protection circuit board 100. The positive and negative electrode tabs 16 and 17 are respectively connected to positive and negative electrode terminals 101 and 102 provided in the protection circuit board 100. Thereafter, the protection circuit board 100 is mounted on the sealing surface 12b of the case 12.

However, the conventional lithium secondary battery 10 has several problems. Unlike the cylindrical or rectangular lithium secondary battery, the pouch-type lithium secondary battery 10 requires a predetermined width of the sealing surface 12b of the case 12 to mount the protection circuit board 100 thereon. In order to mount the protection circuit board 100 on the sealing surface 12b, the positive and negative electrode tabs 16 and 17, extending outward from the sealing surface 12b, are bent at least once.

In other words, as shown in FIG. 2, the positive and negative electrode tabs 16 and 17 are bent in an S-shaped form such that edges of the positive and negative electrode tabs 16 and 17 are bent once at portions where they extend outward from the sealing surface 12b, and are then bent again in the opposite direction. The protection circuit board 100 is seated on top of the thus-bent positive and negative electrode tabs 16 and 17.

In order to mount the protection circuit board 100 in such a manner, it is necessary for the sealing surface 12b to have a predetermined width W1 corresponding to a width of the protection circuit board 100.

In recent years, the battery unit 11 of the lithium secondary battery 10 has become larger in order to obtain a large capacity lithium secondary battery. Thus, the space 12a in which the battery unit 11 is accommodated has tended to increase, while minimizing the area of the sealing surface 12b. This has introduced a critical problem of developing efficient methods of attaching the protection circuit board 100 to a limited area of the sealing surface 12b.

Because the positive and negative electrode tabs 16 and 17 are bent in an S-shaped form, they may be easily cut at bent portions during a bending process. Also, at portions where the positive and negative electrode tabs 16 and 17 extend outward from the sealing surface 12b of the case 12, the positive and negative electrode tabs 16 and 17 may be electrically connected to a medium layer exposed along the edge of the case 12 by a cutting process, resulting in a short-circuit.

SUMMARY OF THE INVENTION

The present invention provides a pouch-type lithium secondary battery having a minimized sealing surface of a case by providing an improved connection structure in which a protection circuit board electrically connected to electrode tabs is attached at an outer surface of a case, and a fabrication method of the lithium secondary battery.

The present invention also provides a pouch-type lithium secondary battery which can prevent a short-circuit between a case and an electrode tab by improving a bending structure of the electrode tabs extending outside the case, and a fabrication method of the lithium secondary battery.

Additional aspects and/or advantages of the invention will be set forth in part in the description which follows and, in part, will be obvious from the description, or may be learned by practice of the invention.

According to an aspect of the present invention, there is provided a pouch-type lithium secondary battery comprising a battery unit having a positive electrode plate, a separator, and a negative electrode plate, wherein the separator is disposed between the positive and negative electrode plates, electrode tabs extending from each of the positive and negative electrode plates of the battery unit, respectively, a case having a space to accommodate the battery unit, a sealing surface along the periphery of the space, and a protection circuit board electrically connected to the electrode tabs, wherein portions of each of the electrode tabs extend outside the case, and are bent in an upright position with respect to a plane of the sealing surface.

According to another aspect of the invention, there is provided a method of fabricating a lithium secondary battery, the method comprising preparing a battery unit comprising a positive electrode plate, a negative electrode plate, and a separator disposed between the positive and negative electrode plates, disposing the battery unit in a space provided in a case and sealing a sealing surface formed along the periphery of the space, electrically connecting electrode terminals of a protection circuit board to electrode tabs extending outside the case, wherein the electrode tabs are electrically connected to each of the positive and negative electrode plates of the battery unit, respectively, and bending portions of each of the electrode tabs extending outside of the case through the sealing surface in an upright position with respect to a plane of the sealing surface of the case.

According to another aspect of the invention, there is provided a pouch-type lithium secondary battery comprising a case providing a space to accommodate a battery unit, a sealing surface along the periphery of the space, and a protection circuit board electrically connected to electrode tabs extending outside the case from the battery unit, wherein the electrode tabs are bent in a thickness direction of the case, the electrode tabs being respectively connected to electrode terminals of the protection circuit board.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
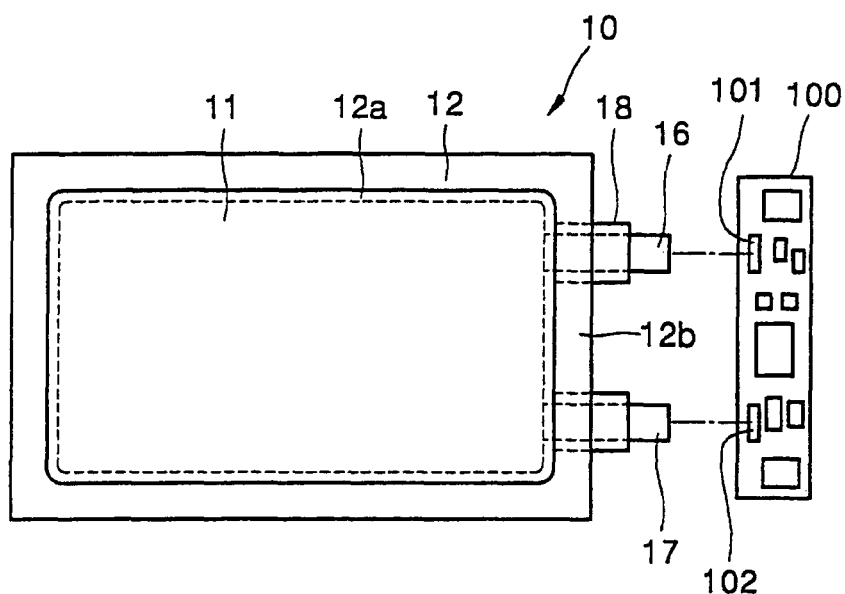
FIG. 1 is a plan view of a conventional lithium secondary battery.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
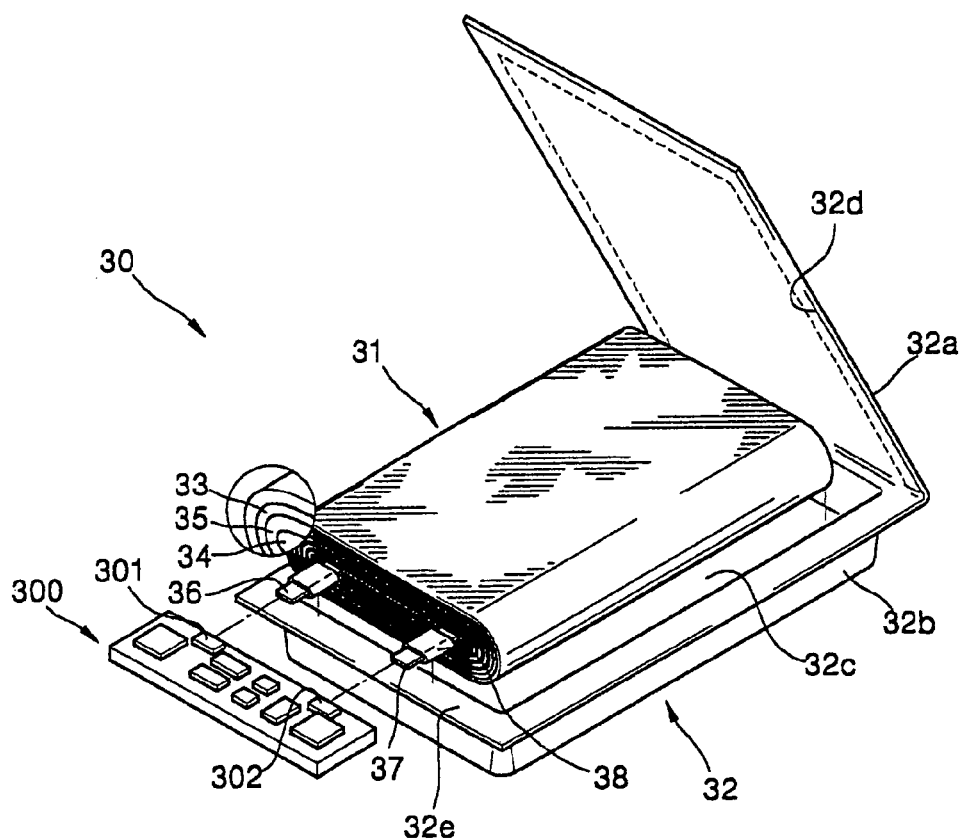
FIG. 3 is a partly enlarged view of a lithium secondary battery according to an embodiment of the present invention.

FIG. 3 shows a pouch-type lithium secondary battery 30 according to an embodiment of the present invention.

Referring to FIG. 3, the lithium secondary battery 30 includes a battery unit 31 and a case 32 accommodating the battery unit 31.

The battery unit 31 includes a positive electrode plate 33, a negative electrode plate 34 and a separator 35 interposed therebetween.

The positive electrode plate 33 has a positive electrode slurry comprising a lithium-based oxide as a main component, a binder, a plasticizer, a conductive agent, and the like, coated on a positive electrode current collector formed of a strip-shaped metal foil, e.g., an aluminum foil. A positive electrode tab 36 is welded to the positive electrode plate 33.

The negative electrode plate 34 has a negative electrode slurry comprising a carbon material as a main component, a binder, a plasticizer, a conductive agent, and the like, coated on a negative electrode current collector formed of a strip-shaped metal foil, e.g., a copper foil. A negative electrode tab 37 is welded to the negative electrode plate 34.

At least one sheet of the separator 35 is disposed between the positive electrode plate 33 and the negative electrode plate 34 for insulation therebetween. The separator 35 may be made of polyethylene, polypropylene, or a composite film of polyethylene and polypropylene. In order to prevent a short-circuit between the positive and negative electrode plates 33 and 34, it is advantageous, though not necessary, that the separator 35 is wider than the positive or negative electrode plate 33, 34.

The case 32 includes an upper case body 32a and a lower case body 32b coupled to the upper case body 32a. The upper and lower case bodies 32a and 32b are integrally coupled to each other along at least one periphery. When the upper and lower case bodies 32a and 32b are welded to each other, the case 32 is shaped of a substantially rectangular solid. A space 32c in which the battery unit 31 is accommodated is provided in at least one of the upper and lower case bodies 32a and 32b.

After the battery unit 31 is accommodated in the space 32c of the case 32, the case 32 is sealed at upper and lower sealing surfaces 32d and 32e by a method such as thermal fusion. The upper and lower sealing surfaces 32d and 32e are provided at a portion where the upper and lower case bodies 32a and 32b are coupled to each other. The lower sealing surface 32e is formed along the periphery of the space 32c. The upper sealing surface 32d is formed at a portion of the upper case body 32a corresponding to the lower sealing surface 32e, the upper sealing surface 32d being in contact with the lower sealing surface 32e, thus providing a sealing surface.

The upper and lower case bodies 32a and 32b are preferably, though not necessarily, formed of substantially the same material, and are constructed of multiple layers including an inner coating made of a polymeric insulating layer, a medium layer made of a metal foil for maintaining formability, and an outer coating made of a polymeric insulating layer.

The battery unit 31 having the above-described structure can be wound in a direction such that the positive electrode plate 33, the separator 35, and the negative electrode plate 34 are disposed sequentially in that order, that is, in a jelly-roll type structure. The wound battery unit 31 is accommodated in the space 32c. Here, edges of the positive and negative electrode tabs 36 and 37, drawn out from the respective electrode plates 33 and 34 of the battery unit 31, extend outside the closed case 32.

An insulating tape 38 is wrapped around an outer surface of each of the positive and negative electrode tabs 36 and 37. One end of the insulating tape 38 is disposed between the upper and lower sealing surfaces 32d and 32e, and is fusibly sealed together during thermal fusion of the case 32, while the other end of the insulating tape 38 is exposed to the outside of the case 32.

The ends of the positive and negative electrode tabs 36 and 37 exposed to the outside of the case 32 are electrically connected to a protection circuit board 300. The protection circuit board 300 prevents combustion or explosion of the battery 30 in the event of abnormal operation of the battery, such as, for example, overcharging, by rapidly interrupting current flow. As one example, a safety element such as a positive temperature coefficient (PTC) element may be provided as the protection circuit board 300. The positive and negative electrode tabs 36 and 37, extending outward from the respective electrode plates 33 and 34 of the battery unit 31, are electrically connected to the positive and negative electrode terminals 301 and 302, respectively, formed in the protection circuit board 300.

Figure 4:
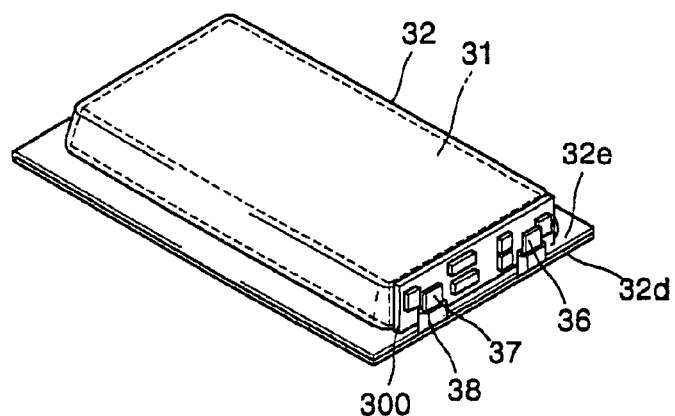
FIG. 4 is a cross-sectional view showing the lithium secondary battery shown in FIG. 3.

In the pouch-type lithium secondary battery 30 having the above-described structure, as shown in FIG. 4, the upper sealing surface 32d and the lower sealing surface 32e are thermally fused to each other to seal the inside of the case 32 such that the battery unit 31 is provided within the case 32.

Figure 5:
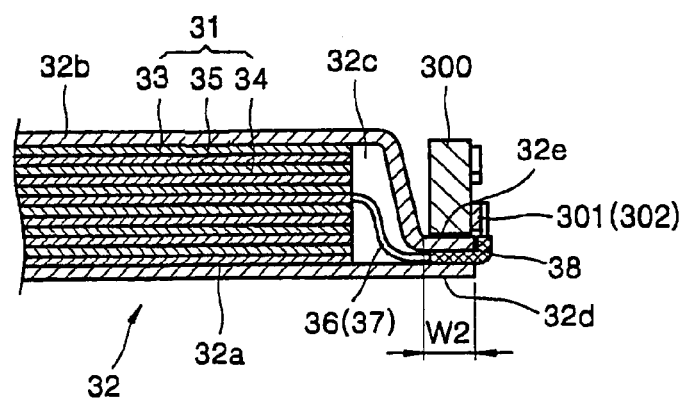
FIG. 5 is a partly extracted perspective view of the lithium secondary battery shown in FIG. 3.

Here, the ends of the positive and negative electrode tabs 36 and 37, extending outside the case 32, are electrically connected to the positive and negative electrode terminals 301 and 302 of the protection circuit board 300, respectively, and the ends of the positive and negative electrode tabs 36 and 37 are bent in a thickness direction of the case 32, which is described in more detail in FIG. 5.

Referring to FIG. 5, the wound battery unit 31, in which the positive electrode plate 33, the separator 35, and the negative electrode plate 34 are laminated in that order, is disposed in the space 32c formed by the connection of the upper and lower case bodies 32a and 32b. The positive and negative electrode tabs 36 and 37, extending outward from the positive and negative electrode plates 33 and 34, respectively, pass between the upper and lower sealing surfaces 32d and 32e, and extend a predetermined length outside the case 32. As described above, the insulating tape 38 is wrapped around an outer surface of each of the positive and negative electrode tabs 36 and 37 for the purpose of electrically isolating the positive and negative electrode tabs 36 and 37 from the case 32.

The ends of the positive and negative electrode tabs 36 and 37 are connected to the positive and negative electrode terminals 301 and 302 of the protection circuit board 300, respectively. A portion of each of the positive and negative electrode tabs 36 and 37, extending outside the case 32, is bent from a leading edge of the upper and lower sealing surfaces 32d and 32e in a thickness direction of the case 32, e.g., in a thickness direction of the lower case body 32b. Here, the positive and negative electrode tabs 36 and 37 may be bent at a substantially right angle.

In a state in which the positive and negative electrode tabs 36 and 37 are bent, they are not further bent toward the upper and lower sealing surfaces 32d and 32e, but are disposed parallel to an outer wall of the case 32 in an upright position. Accordingly, the positive and negative electrode tabs 36 and 37 are perpendicular to a contact surface at which the upper and lower sealing surfaces 32d and 32e are contacted.

In order to prevent a short-circuit between the positive and negative electrode tabs 36 and 37 and the case 32, the insulating tape 38 is preferably, though not necessarily, wrapped around the outer surface of the positive and negative electrode tabs 36 and 37 at portions where the positive and negative electrode tabs 36 and 37 are bent at the leading edge of the upper and lower sealing surfaces 32d and 32e.

The protection circuit board 300, which is electrically connected to the positive and negative electrode tabs 36 and 37, is disposed on the lower sealing surface 32e. In other words, when the positive and negative electrode tabs 36 and 37 are bent perpendicular to the contact surface between the upper and lower sealing surfaces 32d and 32e, the protection circuit board 300 can be placed between the outer wall of the lower case body 32b and the positive and negative electrode tabs 36 and 37.

Figure 2:
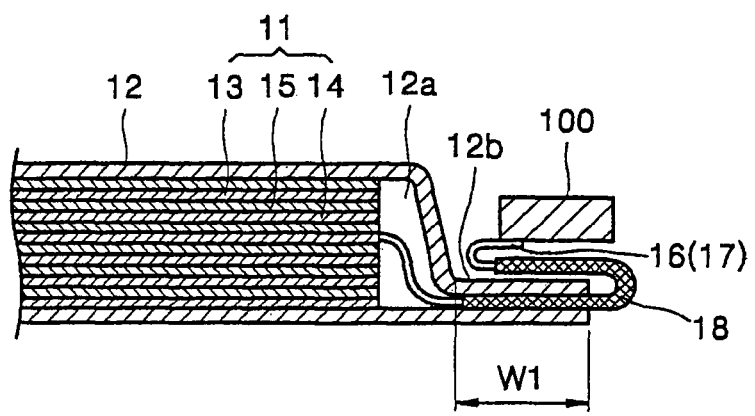
FIG. 2 is a partly extracted perspective view of the lithium secondary battery shown in FIG. 1.

Also, since the protection circuit board 300 is disposed widthwise in an upright position between the outer wall of the lower case body 32b and the positive and negative electrode tabs 36 and 37, the upper and lower sealing surfaces 32d and 32e only have to have a minimum width $W_2$ for accommodating the protection circuit board 300. Thus, the width $W_2$ of the upper and lower sealing surfaces 32e and 32d can be reduced compared to the width $W_1$ of the conventional sealing surface (12b shown in FIG. 2), in which a protection circuit board is not disposed in an upright position.

Alternatively, the portions of the positive and negative electrode tabs 36 and 37 extending outside the case 32 may be bent at a right angle together with the leading edge of the upper and lower sealing surfaces 32d and 32e, so that the protection circuit board 300 may be placed between the outer wall of the lower case body 32b and the bent positive and negative electrode tabs 36 and 37.

Table 1 shows that the capacity of the battery unit 31 increases due to an increase in the area of the space 32c as the protection circuit board 300 is disposed in an upright position.

TABLE 1

|  | Sample 1 | Sample 2 | Sample 3 | Sample 4 |
| --- | --- | --- | --- | --- |
| Conventional capacity | 1165 mAh | 984 mAh | 857 mAh | 843 mAh |
| Capacity when sealing surface is reduced | 1220 mAh | 1030 mAh | 898 mAh | 875 mAh |
| Increasing amount of capacity | 55 mAh | 46 mAh | 41 mAh | 32 mAh |
| Increasing ratio of capacity | 4.7 | 4.7 | 4.8 | 3.8 |

Referring to Table 1, conventionally, samples 1-4 had capacities of 1165 mAh, 984 mAh, 857 mAh, and 843 mAh, respectively, and a sealing surface width of 4.5 mm. In the present invention, capacities of the samples 1-4 were increased to 1220 mAh, 1030 mAh, 898 mAh, and 875 mAh, respectively, and a sealing surface width of 2.5 mm. That is, the samples of the present invention showed capacity increases of 55 mAh, 46 mAh, 41 mAh, and 32 mAh, respectively.

As described above, the pouch-type lithium secondary battery according to the present invention and a fabrication method thereof has several advantages, a few of which are described below.

First, since an electrode tab exposed outside a sealing surface of a case is bent from a leading edge of the sealing surface to be disposed in an upright position, and a protection circuit board electrically connected to the thus bent electrode tab is placed between an outer wall of the case and the electrode tab, an area of the sealing surface of the case can be minimized.

Second, since the protection circuit board, which is electrically connected to the bent electrode tab, is disposed substantially perpendicular to the sealing surface, an area of the sealing surface of the case can be minimized.

Third, as the area of the sealing surface of the case is reduced, an internal area of the case can be increased as much as the area of the sealing surface is reduced. Accordingly, the capacity of a battery unit accommodated inside the case can be increased.

Fourth, since the electrode tab is disposed in an upright position with respect to the case, damage due to bending of the electrode tab can be prevented, thereby ensuring safety of the battery.

Fifth, since an insulating tape is wrapped around a portion where the electrode tab is bent from the leading edge of the sealing surface of the case, a short-circuit between the electrode tab and the case can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pouch-type lithium secondary battery comprising:
   a battery unit comprising:
      a positive electrode plate,
      a separator, and
      a negative electrode plate,
      wherein the separator is disposed between the positive and negative electrode plates;
   electrode tabs extending from each of the positive and negative electrode plates;
   a case having a space to accommodate the battery unit, comprising an upper case body having a main surface and a sealing surface and a lower case body having a main surface and a sealing surface, wherein the upper and lower case bodies are joined together at a sealing portion defined by the sealing surfaces disposed along the periphery of the space, wherein the sealing portion comprises an edge, wherein the case has an outer wall substantially perpendicular to the main surfaces of the upper and lower case bodies; and
   a protection circuit board having electrode terminals directly electrically connected to the positive and negative electrode plates, via the electrode tabs,
   wherein the electrode tabs extend from the positive and negative electrode plates, through the sealing portion and past the edge of the sealing portion, and are bent only once so as to extend in a plane that is disposed at a substantially right angle with respect to a plane of the sealing portion and with respect to the sealing surfaces of the upper and lower case bodies, without extending beyond a thickness of the case,
   wherein the protection circuit board is disposed between the outer wall of the case and the bent electrode tabs wherein the protection circuit board is arranged at the right angle between the outer wall of the case and the bent electrode tab such that the bottom surface of the protection circuit board contacts the sealing surface of the case;
   wherein the electrode terminals of the protection circuit board are positioned so as to be vertically aligned with the electrode tabs to thereby contact the electrode tabs bent in a direction that is vertical with respect to the sealing portion of the case, so that the vertically extending portions of the electrode tabs are positioned outwards of the edge of the sealing portion, and
   wherein the electrode tabs have main surfaces that are disposed parallel to the outer wall of the case, in an upright position, and are perpendicular to a contact surface at which the electrode tabs contact the edge of the sealing portion and wherein the electrode tabs are connected to the electrode terminals of the protection circuit board on the outer side surface of the protection circuit board in a direction away from the outer wall of the case.

2. The pouch-type lithium secondary battery of claim 1, further comprising insulating tape to provide electrical insulation between the electrode tabs and the sealing portion, wherein the insulating tape is wrapped around the portions of the electrode tabs bent from the edge of the sealing portion.

3. The pouch-type lithium secondary battery of claim 1, wherein the electrode tabs connect to the protection circuit board on a side opposite to the outer wall of the case.

* * * * *